A. INGALLS.
Wheel-Plow.
No. 55,108.  Patented May 29, 1866.
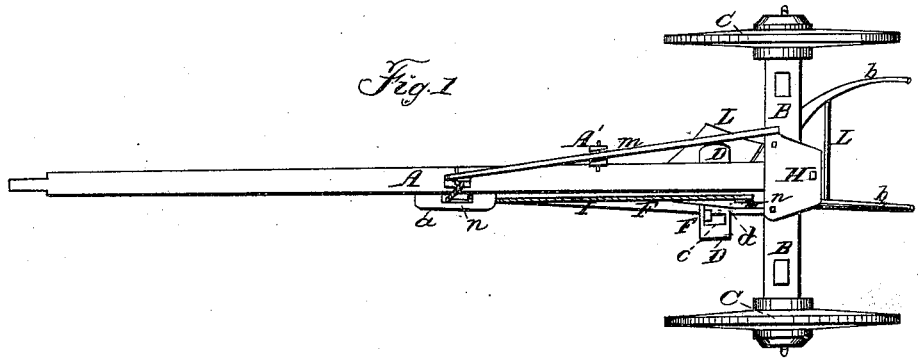
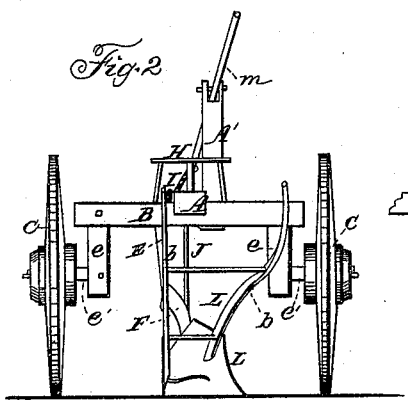
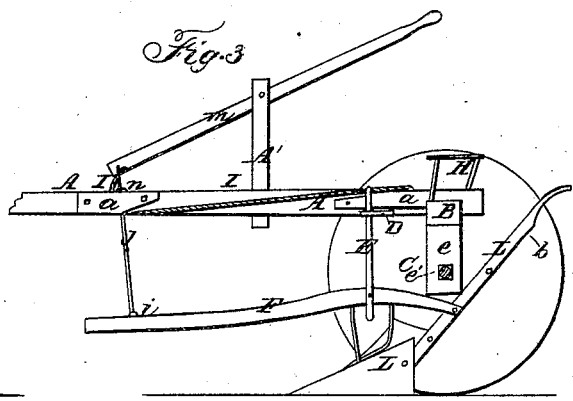
Witnesses
Frank Alden
A. W. McClellan
Inventor
A. Ingalls

UNITED STATES PATENT OFFICE.

A. INGALLS, OF INDEPENDENCE, IOWA.

IMPROVEMENT IN CARRIAGE-PLOWS.

Specification forming part of Letters Patent No. 55,108, dated May 29, 1866.

*To all whom it may concern:*

Be it known that I, A. INGALLS, of Independence, in the county of Buchanan and State of Iowa, have invented certain new and useful Improvements in Carriage-Plows; and I do hereby declare that the following is a full and complete description of the construction and operation of the same, reference being had to the accompanying drawings, making a part of this specification, in which—

Figure 1 is a plan view. Fig. 2 is a view of the rear end. Fig. 3 is a side elevation.

Like letters of reference refer to like parts in the several views.

A is the tongue of the machine or carriage, that is secured at the rear end to a crosspiece, B, from the ends of which extend down arms $c$, that the journals $e'$ of wheels C are attached to.

Underneath the tongue, between the wheels, is arranged a plow, L, of the ordinary construction, with handles $b$ and beam F in front. To the beam, near the rear end, is secured a standard, E, that extends up through a slot, $c$, in a guide, D, attached to the under side of the tongue by bolts passing through a slot in the guide-plate into the tongue, so that the guide can be adjusted to the right or left, according to the position of the plow.

To the front of the plow-beam, by an eyebolt, $i$, is connected a rod, J, that extends up through a slot in the tongue, and is attached to the end of a lever, $m$, pivoted to a standard, A', secured to the tongue.

$n$ $n'$ are pulleys arranged on one side of the tongue, over the plow-beam, one at the front and the other near the rear end, over the beam. These pulleys have their bearings in the tongue and pieces $a$, secured on the side, as represented.

I is a cord or chain attached at one end to the plow-beam near the handles, that passes over the pulley $n'$, along the tongue, under the pulley $n$, and is fastened to the front end of the lever.

H is a seat on the cross-piece B, upon which the driver can sit and adjust the plow by means of the lever in the following manner: The standard E, passing up through the guide D, retains the plow in an upright position. By raising the rear end of the lever the front end of the plow-beam is depressed, which will force the plow quickly into the ground, and by reversing the movement of the lever the forward end of the beam is raised, that will run the plow up out of the ground. By means of the pulleys $n$ $n'$, cord or chain I, in connection with the lever, standard E, and rod J, the entire plow can be elevated above the ground by raising the forward end of the lever sufficiently, which is for the purpose of backing, turning, or going forward, without having the plow enter the ground or plow it up in any way. Thus the driver sitting on the seat can readily adjust the plow in or out of the ground more or less, as may be desired for the most perfect cultivation. Any plow may be used with no alteration, excepting the addition of a standard, E, and eyebolt $i$, for attaching the rod J to the front end of the beam.

The whiffletrees for attaching the horses are connected to the front end of the plow in the ordinary way.

The plow as arranged is free and unencumbered to operate as it would alone without the riding attachment.

By putting the pulleys $n$ $n'$ on the other side of the tongue and turning round the guide-plate D on the other side a left-handed plow can be used.

The carriage is attached to the plow by means of a chain, one end of which is fastened to the under side of the axle of the carriage and the other end is attached to the upper side of the plow-beam near the standard E.

By coupling two plows together by cross-bars in such a position as to allow the hindermost one to turn its furrow immediately behind the other, and by attaching the lifting device to the cross-bars midway between the plows, two plows can be operated as well as one, thereby enabling one man to do the work of two.

What I claim as my improvement, and desire to secure by Letters Patent, is—

The lever $m$, standard E, rod J, and pulleys $n$ $n'$, in combination with the chain or cord I, guide-plate D, and plow, arranged substantially as and for the purpose set forth.

A. INGALLS.

Witnesses:
JED LAKE,
M. D. SMITH.